(12) United States Patent
Huang et al.

(10) Patent No.: US 8,269,941 B2
(45) Date of Patent: Sep. 18, 2012

(54) LIQUID CRYSTAL DISPLAY PANEL

(75) Inventors: Wei-Kai Huang, Tainan (TW);
Jen-Chieh Hsieh, Changhua County (TW); Lung-Ling Tang, Taipei County (TW)

(73) Assignee: Au Optronics Corporation, Hsinchu (TW)

( * ) Notice: Subject to any disclaimer, the term of this patent is extended or adjusted under 35 U.S.C. 154(b) by 293 days.

(21) Appl. No.: 12/831,269

(22) Filed: Jul. 7, 2010

(65) Prior Publication Data

US 2011/0261309 A1    Oct. 27, 2011

(30) Foreign Application Priority Data

Apr. 27, 2010    (TW) .............................. 99113291 A

(51) Int. Cl.
*G02F 1/1339*    (2006.01)
(52) U.S. Cl. ....................................................... 349/155
(58) Field of Classification Search ................... 349/155, 349/144
See application file for complete search history.

(56) References Cited

U.S. PATENT DOCUMENTS

| 2009/0009709 A1* | 1/2009 | Niiya .............................. 349/156 |
| 2009/0231522 A1* | 9/2009 | Kim et al. ...................... 349/106 |

FOREIGN PATENT DOCUMENTS

| TW | I247941 | 1/2006 |
| TW | I308972 | 4/2009 |

* cited by examiner

*Primary Examiner* — Sung Pak
(74) *Attorney, Agent, or Firm* — Jianq Chyun IP Office

(57) ABSTRACT

A liquid crystal display panel including an active device array substrate, an opposite substrate, a plurality of spacers and a liquid crystal layer is provided. The active device array substrate includes a plurality of position limiting structures, each including a first and a second position limiting pattern. The opposite substrate is disposed above the active device array substrate. The spacers are disposed on the opposite substrate, and the spacers are protruded towards the active device array substrate and extended adjacent to the first and second position limiting patterns. Displacement of each spacer is limited by the first or second position limiting pattern. The first position limiting patterns limit the displacement of a portion of the spacers along a first azimuth range, the second position limiting patterns limit the displacement of a portion of the spacers along a second azimuth range, and the first and second azimuth ranges are different.

29 Claims, 14 Drawing Sheets

LIQUID CRYSTAL DISPLAY PANEL

CROSS-REFERENCE TO RELATED APPLICATION

This application claims the priority benefit of Taiwan application serial no. 99113291, filed on Apr. 27, 2010. The entirety of the above-mentioned patent application is hereby incorporated by reference herein and made a part of this specification.

BACKGROUND OF THE INVENTION

1. Field of the Invention

The invention relates generally to a display panel, and more particularly to a liquid crystal display panel.

2. Description of Related Art

With advantages of high definition, small volume, light weight, low driving voltage, low power consumption, and an extensive range of applications, the liquid crystal display (LCD) has become the mainstream device among various display products. The conventional LCD panel is constituted by an active device array substrate, a color filter substrate, and a liquid crystal layer sandwiched therebetween. Moreover, photo spacers are disposed between the color filter substrate and the active device array substrate, so as to maintain a cell gap between the two substrates and to control a thickness of the liquid crystal layer.

Typically speaking, in order to prevent the photo spacers from affecting an aperture ratio of the LCD panel, the photo spacers are disposed around the scan lines of the black matrix in the color filter substrate and the active device array substrate. However, when the LCD panel is pressed or under stress, a relative displacement may be generated between the color filter substrate and the active device array substrate, such that a light originally shielded by the black matrix is leaked. Consequently, a movable mura phenomenon occurs on the LCD panel. Particularly, since a strong electric field is typically generated around the scan lines, the liquid crystal molecules located therein has a chaotic tilt direction. Therefore, when relative displacement is generated between the color filter substrate and the active device array substrate, light leakage severely affects a display quality of the LCD panel.

SUMMARY OF THE INVENTION

An aspect of the invention provides a liquid crystal display (LCD) panel capable of preventing an misalignment between two substrates by limiting a displacement of the spacers.

An aspect of the invention provides an LCD panel including an active device array substrate, an opposite substrate, a plurality of spacers, and a liquid crystal layer. The active device array substrate includes a plurality of position limiting structures, and each of the position limiting structures includes a first position limiting pattern and a second position limiting pattern. The opposite substrate is disposed above the active device array substrate. A plurality of spacers are disposed on the opposite substrate, in which the spacers are protruded towards the active device array substrate and extended adjacent to the first and second position limiting patterns. A displacement of each of the spacers is limited only by one of the first position limiting patterns or one of the second position limiting patterns. The first position limiting patterns limit the displacement of a portion of the spacers along a first azimuth range, and the second position limiting patterns limit the displacement of a portion of the spacers along a second azimuth range. Moreover, the first azimuth range and the second azimuth range are different. The liquid crystal layer is disposed between the active device array substrate and the opposite substrate.

In summary, the position limiting structures of the LCD panel according to embodiments of the invention can limit the displacement of the spacers, so as to prevent an misalignment between two substrates when the LCD panel is pressed or under stress. Accordingly, a light leakage phenomenon of the LCD panel can be avoided, and thereby the LCD panel is able to achieve a preferable display quality.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
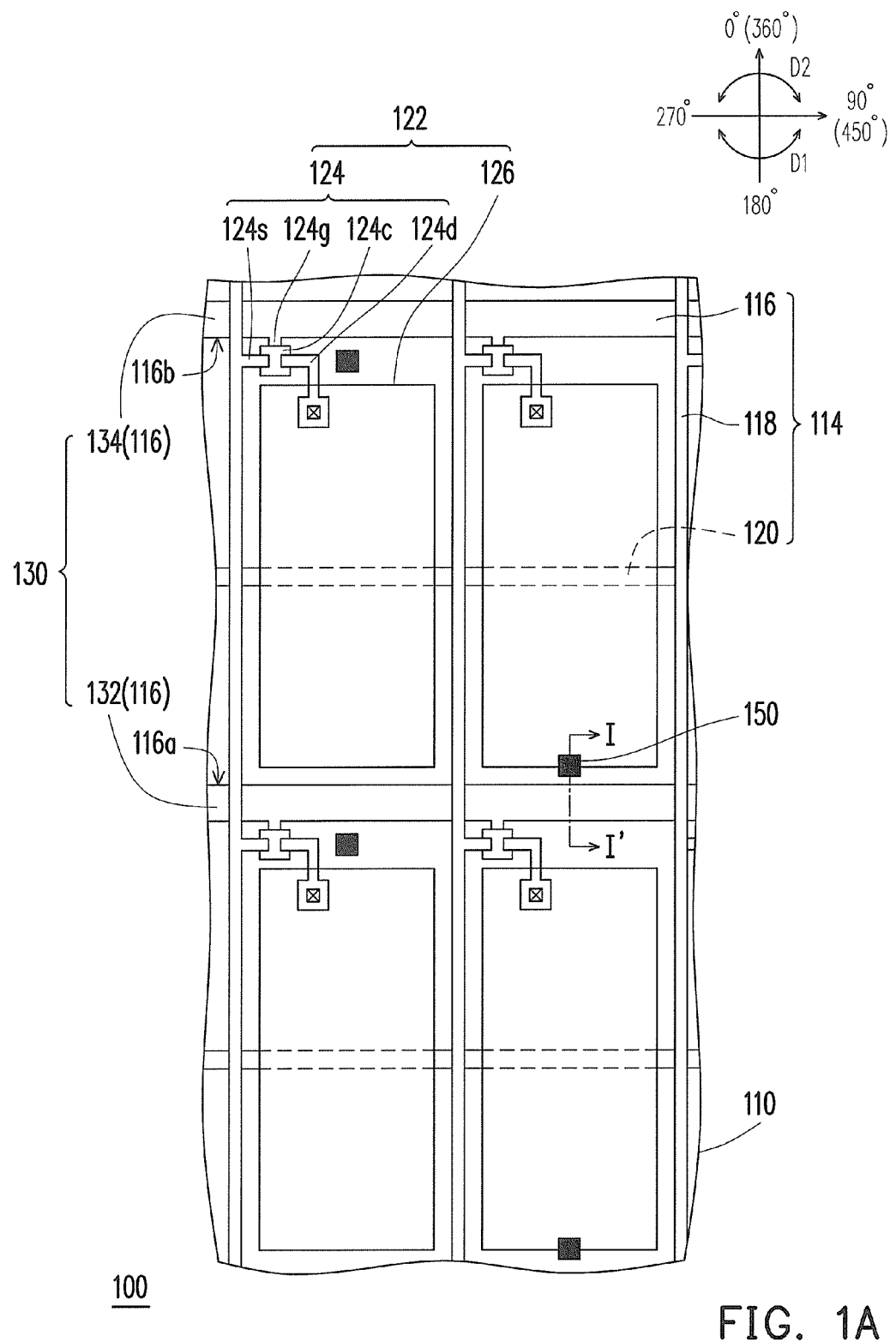
FIG. 1A is a schematic top view of an LCD panel in accordance with an embodiment of the invention.
Figure 1B:
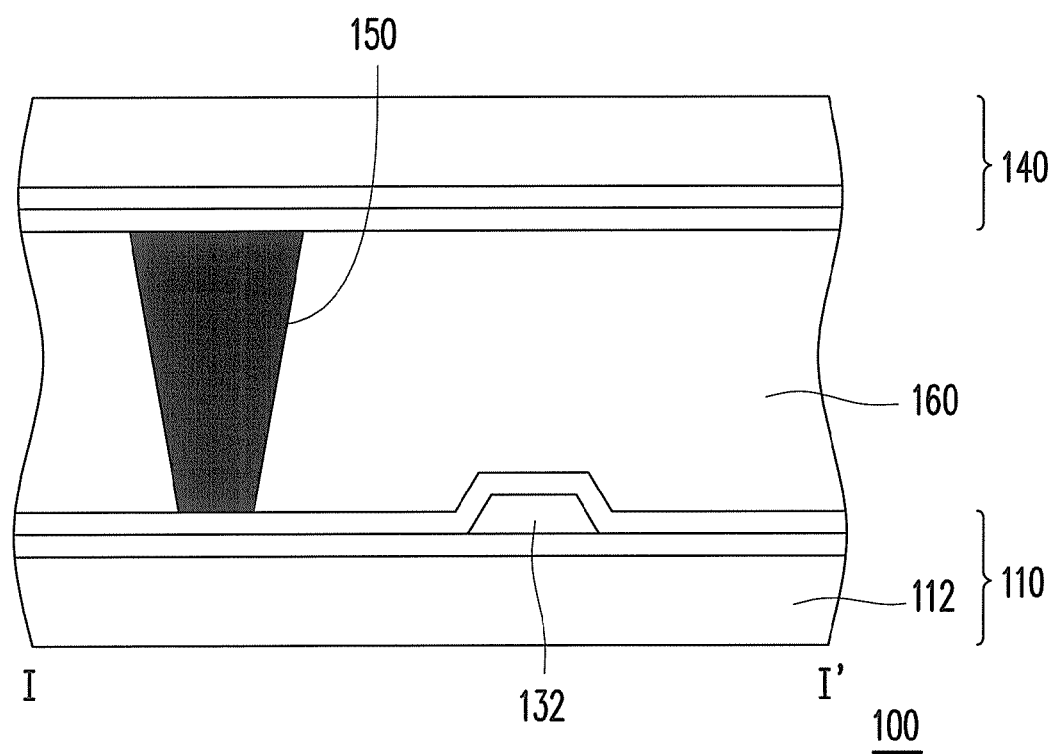
FIG. 1B is a partial schematic cross-section view of FIG. 1A along a line I-I'.

FIG. 1A is a schematic top view of a liquid crystal display (LCD) panel in accordance with an embodiment of the invention. FIG. 1B is a partial schematic cross-sectional view of FIG. 1A along a line I-I'. For clarity of illustration, an opposite substrate and a liquid crystal layer are not shown in FIG. 1A. Referring to FIGS. 1A and 1B, an LCD panel 100 according to the present embodiment includes an active device array substrate 110, an opposite substrate 140, a plurality of spacers 150, and a liquid crystal layer 160. The active device array substrate 110 includes a plurality of position limiting structures 130, in which each of the position limiting structures 130 includes a first position limiting pattern 132 and a second position limiting pattern 134. The opposite substrate 140 is disposed above the active device array substrate 110. The liquid crystal layer 160 is disposed between the active device array substrate 110 and the opposite substrate 140. The plurality of spacers 150 are disposed on the opposite substrate 140, in which the spacers 150 are protruded towards the active device array substrate 110 and extended adjacent to the first and second position limiting patterns 132 and 134. A displacement of each of the spacers 150 is limited only by one of the first position limiting patterns 132 or is limited only by one of the second position limiting patterns 134. The first position limiting patterns 132 limit the displacement of a portion of the spacers 150 along a first azimuth range D1, and the second position limiting patterns 134 limit the displacement of a portion of the spacers 150 along a second azimuth range D2. Moreover, the first azimuth range D1 and the second azimuth range D2 are different. It should be noted that, "the first azimuth range and the second azimuth range are different" may be interpreted as a first azimuth range D1 and a second azimuth range D2 being partially overlapped with each other, or that the first azimuth range D1 and the second azimuth range D2 are completely not overlapped with each other.

Referring to FIG. 1A, in the present embodiment, the active device array substrate 110 includes a substrate 112, a plurality of signal lines 114, and a plurality of sub-pixels 122. The signal lines 114 are disposed on the substrate 112, and the signal lines 114 include a plurality of scan lines 116, a plurality of data lines 118, and a plurality of common lines 120. The sub-pixels 122 are disposed on the substrate 112 and are electrically connected to the signal lines 114. In more specifics, the sub-pixels 122 include, for example, an active device 124 and a pixel electrode 126 electrically connected to the active device 124. The active device 124 includes a gate 124g, a channel layer 124c, a source 124s, and a drain 124d. The gate 124g and the scan lines 116 are electrically connected, the source 124s and the data lines 118 are electrically connected, and the drain 124d and the pixel electrode 126 are electrically connected.

In the present embodiment, a portion of the scan lines 116 serves as the first position limiting patterns 132, and a portion of the scan lines 116 serves as the second position limiting patterns 134. Moreover, the spacers 150 are extended adjacent to the first and second position limiting patterns 132 and 134 More specifically, a portion of the spacers 150 is exemplarily extended to a first side 116a of the scan lines 116 serving as the first position limiting patterns 132, and a portion of the spacers 150 is exemplarily extended to a second side 116b of the scan lines 116 serving as the second position limiting patterns 134. Accordingly, the first position limiting patterns 132 limit the displacement of a portion of the spacers 150 along a first azimuth range D1, and the second position limiting patterns 134 limit the displacement of a portion of the spacers 150 along a second azimuth range D2. In other words, the displacement of the spacers 150 is limited only by one of the first position limiting patterns 132 or is limited only by one of the second position limiting patterns 134. In the present embodiment of the invention, an extended direction of the data lines 118 is defined as 0°, the first azimuth range D1 is exemplarily 90°-270°, and the second azimuth range D2 is exemplarily 270°-450°. In other words, the position limiting structures 130 including the first and second position limiting patterns 132 and 134 can limit the displacement of the spacers 150 along a vertical direction, so as to prevent an misalignment between the active device array substrate 110 and the opposite substrate 140. It should be mentioned that, in the present embodiment, the plurality of scan lines 116 and common lines 120 are formed by a first patterned conductive layer (Metal 1), for example, and the plurality of data lines 118 are formed by a second patterned conductive layer (Metal 2), for instance. In other words, the first and second position limiting patterns 132 and 134 are formed by the first patterned conductive layer (Metal 1).

Figure 2:
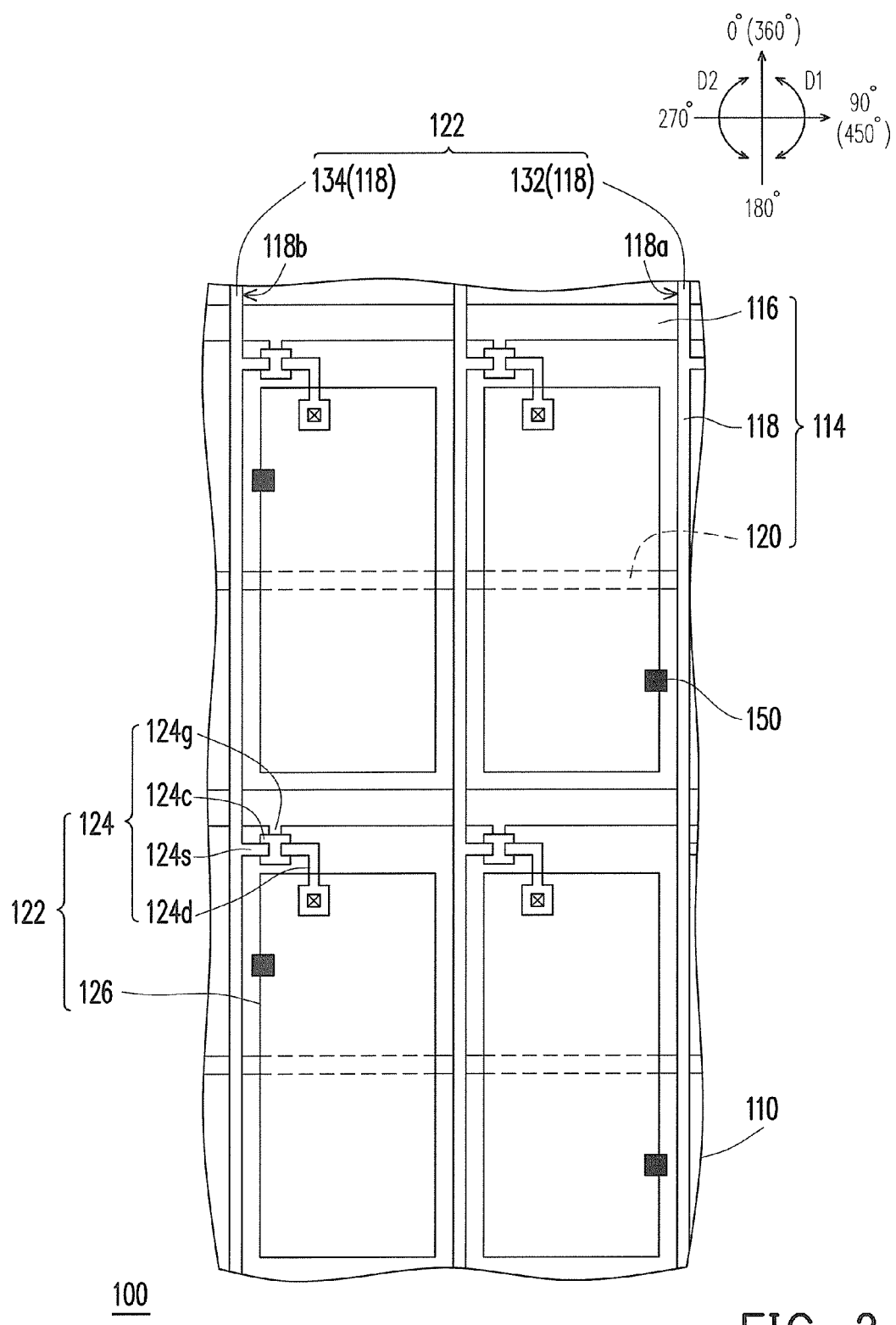
FIG. 2 is a schematic top view of an LCD panel in accordance with an embodiment of the invention.

Although the embodiment depicted by FIG. 1A uses scan lines 116 as the first and second position limiting patterns 132 and 134 for an illustrative example, the signal lines serving as position limiting patterns are not merely limited to scan lines. For example, in another embodiment of the invention as shown in FIG. 2, in the active device array substrate 110, a portion of the data lines 118 serves as the first position limiting patterns 132, and a portion of the data lines 118 serves as the second position limiting patterns 134. Moreover, the spacers 150 are extended adjacent to the first and second position limiting patterns 132 and 134. More specifically, a portion of the spacers 150 is exemplarily extended to a first side 118a of the data lines 118 serving as the first position limiting patterns 132, and a portion of the spacers 150 is exemplarily extended to a second side 118b of the data lines 118 serving as the second position limiting patterns 134. Accordingly, the first position limiting patterns 132 limit the displacement of a portion of the spacers 150 along a first azimuth range D1, and the second position limiting patterns 134 limit the displacement of a portion of the spacers 150 along a second azimuth range D2. In the present embodiment of the invention, an extended direction of the data lines 118 is defined as 0°, the first azimuth range D1 is exemplarily 0°-180°, and the second azimuth range D2 is exemplarily 180°-360°. In other words, the position limiting structures 130 including the first and second position limiting patterns 132 and 134 can limit the displacement of the spacers 150 along a horizontal direction, so as to prevent an misalignment between the active device array substrate 110 and the opposite substrate 140. It should be noted that, in the present embodiment, the plurality of scan lines 116 and common lines 120 are formed by the first patterned conductive layer (Metal 1), for example, and the plurality of data lines 118 are formed by the second patterned conductive layer (Metal 2), for instance. In other words, the first and second position limiting patterns 132 and 134 are formed by the second patterned conductive layer (Metal 2).

Figure 3:
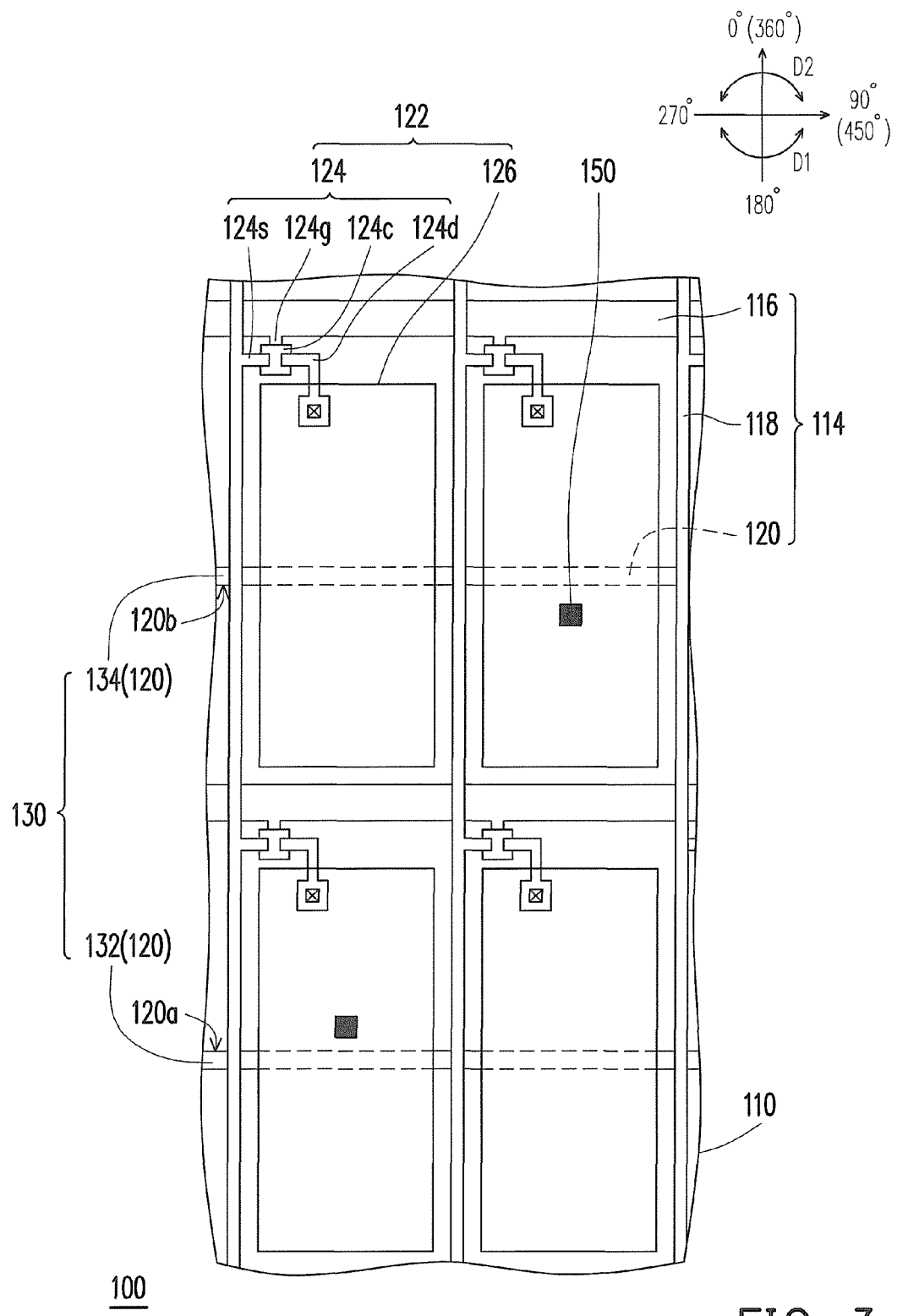
FIG. 3 is a schematic top view of an LCD panel in accordance with an embodiment of the invention.

In another embodiment of the invention as shown in FIG. 3, in the active device array substrate 110, a portion of the common lines 120 may also serve as the first position limiting patterns 132, and a portion of the common lines 120 may serve as the second position limiting patterns 134. More specifically, a portion of the spacers 150 is exemplarily extended to a first side 120a of the common lines 120 serving as the first position limiting patterns 132, and a portion of the spacers 150 is exemplarily extended to a second side 120b of the common lines 120 serving as the second position limiting patterns 134. Accordingly, the first position limiting patterns 132 limit the displacement of a portion of the spacers 150 along a first azimuth range D1, and the second position limiting patterns 134 limit the displacement of a portion of the spacers 150 along a second azimuth range D2. In the present embodiment of the invention, an extended direction of the data lines 118 is defined as 0°, the first azimuth range D1 is exemplarily 90°-270°, and the second azimuth range D2 is exemplarily 270°-450°. In other words, the position limiting structures 130 in the present embodiment including the first and second position limiting patterns 132 and 134 can limit the displacement of the spacers 150 along a vertical direction, so as to prevent an misalignment between the active device array substrate 110 and the opposite substrate 140. It should be noted that, in the present embodiment, the plurality of scan lines 116 and common lines 120 are formed by the first patterned conductive layer (Metal 1), for example, and the plurality of data lines 118 are formed by the second patterned conductive layer (Metal 2), for instance. In other words, the common lines 120 serving as the first and second position limiting patterns 132 and 134 are formed by the first patterned conductive layer (Metal 1).

Figure 4:
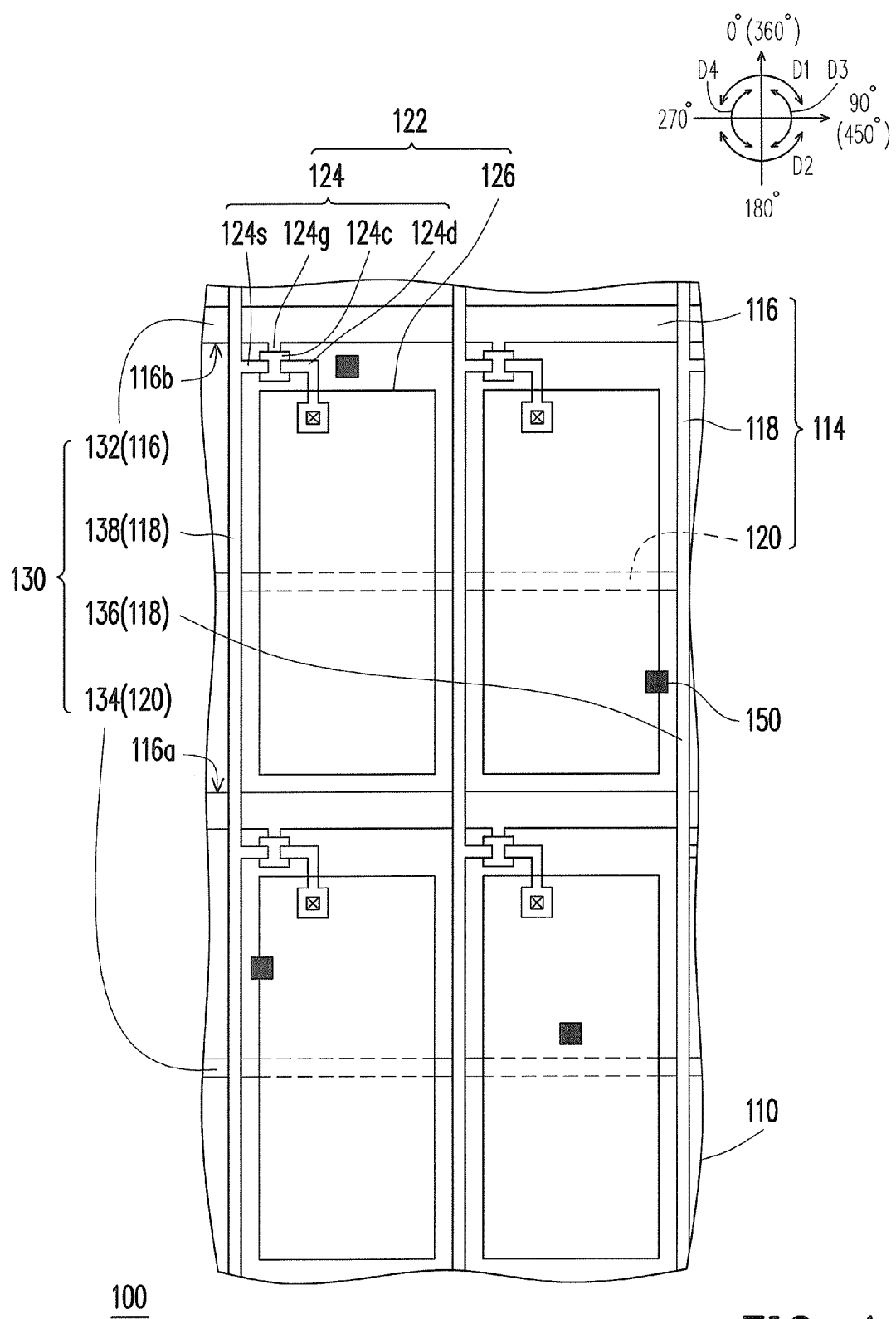
FIG. 4 is a schematic top view of an LCD panel in accordance with an embodiment of the invention.

In another embodiment of the invention as shown in FIG. 4, in the active device array substrate 110, since the scan lines 116 and the common lines 120 are disposed substantially parallel to each other, a scan line 116 may serve as the first position limiting pattern 132 and a common line 120 may serve as the second position limiting pattern 134, so as to limit the displacement of the spacers 150 along the vertical direction. Moreover, the position limiting structures 130 may also include the data lines 118 serving as a plurality of third and fourth position limiting patterns 136 and 138, so as to limit the displacement of the spacers 150 along the horizontal direction. In other words, the first position limiting patterns 132 limit the displacement of a portion of the spacers 150 along the first azimuth range D1, the second position limiting patterns 134 limit the displacement of a portion of the spacers 150 along the second azimuth range D2, the third position limiting patterns 136 limit the displacement of a portion of the spacers 150 along a third azimuth range D3, and the fourth position limiting patterns 138 limit the displacement of a portion of the spacers 150 along a fourth azimuth range D4. In the present embodiment of the invention, an extended direction of the data lines 118 is defined as 0°, the first azimuth range D1 is exemplarily 270°-450°, the second azimuth range D2 is exemplarily 90°-270°, the third azimuth range D3 is exemplarily 0°-180°, and the fourth azimuth range D4 is exemplarily 180°-360°. In other words, the position limiting structures 130 in the present embodiment including the position limiting patterns 132, 134, 136, and 138 can limit the displacement of the spacers 150 along the vertical or the horizontal direction, so as to prevent an misalignment between the active device array substrate 110 and the opposite substrate 140. It should be noted that, in the present embodiment, the plurality of scan lines 116 and common lines 120 are formed by the first patterned conductive layer (Metal 1), for example, and the plurality of data lines 118 are formed by the second patterned conductive layer (Metal 2), for instance. In other words, the scan lines 116 and common lines 120 serving as the first and second position limiting patterns 132 and 134 are formed by the first patterned conductive layer (Metal 1). The data lines 118 serving as the third and fourth position limiting patterns 136 and 138 are formed by the second patterned conductive layer (Metal 2).

According to the foregoing description, the signal lines 114 serving as the position limiting patterns 132, 134, 136, and 138 may include at least one of the scan lines 116, data lines 118, and the common lines 120. Moreover, any two of the scan lines 116 and the common lines 118 may serve as the mutually complementing position limiting patterns 132 and 134, so as to limit the displacement of the spacers 150 along the vertical direction. Additionally, any two of the data lines 118 may serve as the mutually complementing position limiting patterns 136 and 138, so as to limit the displacement of the spacers 150 along the horizontal direction. Therefore, when the LCD panel is pressed or under stress, because movement of the spacers 150 is limited by the position limiting patterns 132, 134, 136, and 138, an misalignment between the active device array substrate 110 and the opposite substrate 140 can be prevented. In particular, since the position limiting patterns 132, 134, 136, and 138 can prevent an misalignment between the active device array substrate 110 and the opposite substrate 140, such that the liquid crystal molecules arranged around the scan lines 116 are not leaked. Thereby, the issue of irregular display in the conventional display panel may be mitigated. In other words, dispositions of the position limiting patterns may further prevent a light leakage phenomenon of the LCD panel, and thereby the LCD panel is able to achieve a preferable display quality.

Figure 5:
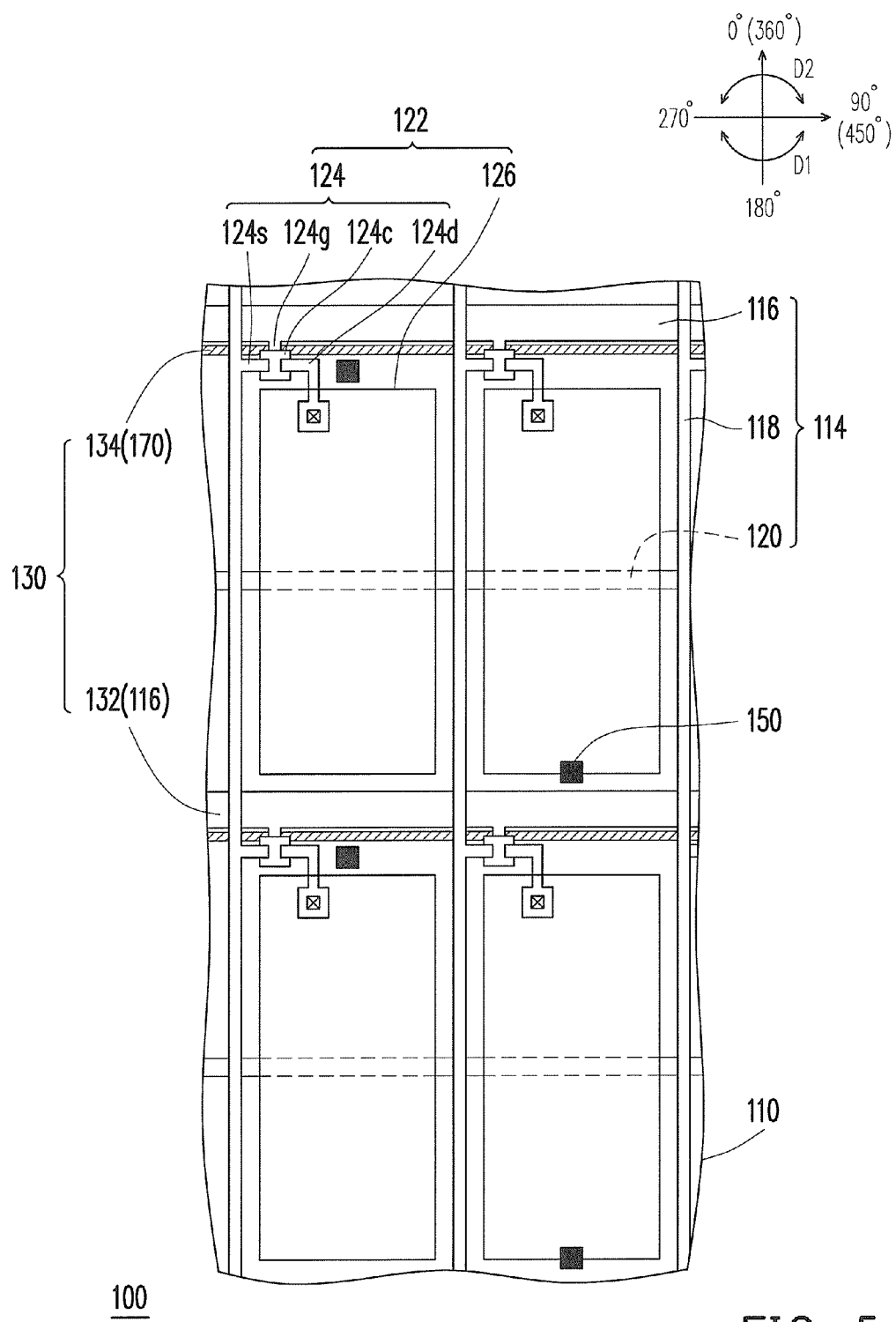
FIG. 5 is a schematic top view of an LCD panel in accordance with an embodiment of the invention.

FIG. 5 is a schematic top view of an LCD panel in accordance with an embodiment of the invention. For clarity of illustration, FIG. 5 omits the opposite substrate and the liquid crystal layer. Referring to FIG. 5, in the present embodiment, the active device array substrate 110 includes a substrate 112, a plurality of signal lines 114, a plurality of dummy lines 170, and a plurality of sub-pixels 122. The signal lines 114 are disposed on the substrate 112, and the signal lines 114 include a plurality of scan lines 116, a plurality of data lines 118, and a plurality of common lines 120. The sub-pixels 122 are electrically connected to the signal lines 114. The dummy lines 170 are disposed on the substrate 112, and an extended direction of the dummy lines 170 is, for example, substantially parallel to an extended direction of the scan lines 116. In the present embodiment, the active device array substrate 110 includes a plurality of position limiting structures 130, in which each of the position limiting structures 130 includes a first position limiting pattern 132 and a second position limiting pattern 134. The scan lines 116 serve as the first position limiting patterns 132, whereas the dummy lines 170 serve as the second position limiting patterns 134. The spacers 150 are extended adjacent to the first and second position limiting patterns 132 and 134. Accordingly, the first position limiting patterns 132 limit the displacement of a portion of the spacers 150 along the first azimuth range D1, and the second position limiting patterns 134 limit the displacement of a portion of the spacers 150 along the second azimuth range D2. In the present embodiment of the invention, an extended direction of the data lines 118 is defined as 0°, the first azimuth range D1 is exemplarily 90°-270°, and the second azimuth range D2 is exemplarily 270°-450°. In other words, the position limiting structures 130 including the first and second position limiting patterns 132 and 134 can limit the displacement of the spacers 150 along the vertical direction, so as to prevent an misalignment between the active device array substrate 110 and the opposite substrate 140. It should be noted that, in the present embodiment, the plurality of scan lines 116, common lines 120, and dummy lines 170 are formed by the first patterned conductive layer (Metal 1), for example, and the plurality of data lines 118 are formed by the second patterned conductive layer (Metal 2), for instance. In other words, the scan lines 116 serving as the first position limiting patterns 132 and the dummy lines 170 serving as the second position limiting patterns 134 are formed by the first patterned conductive layer (Metal 1).

Figure 6:
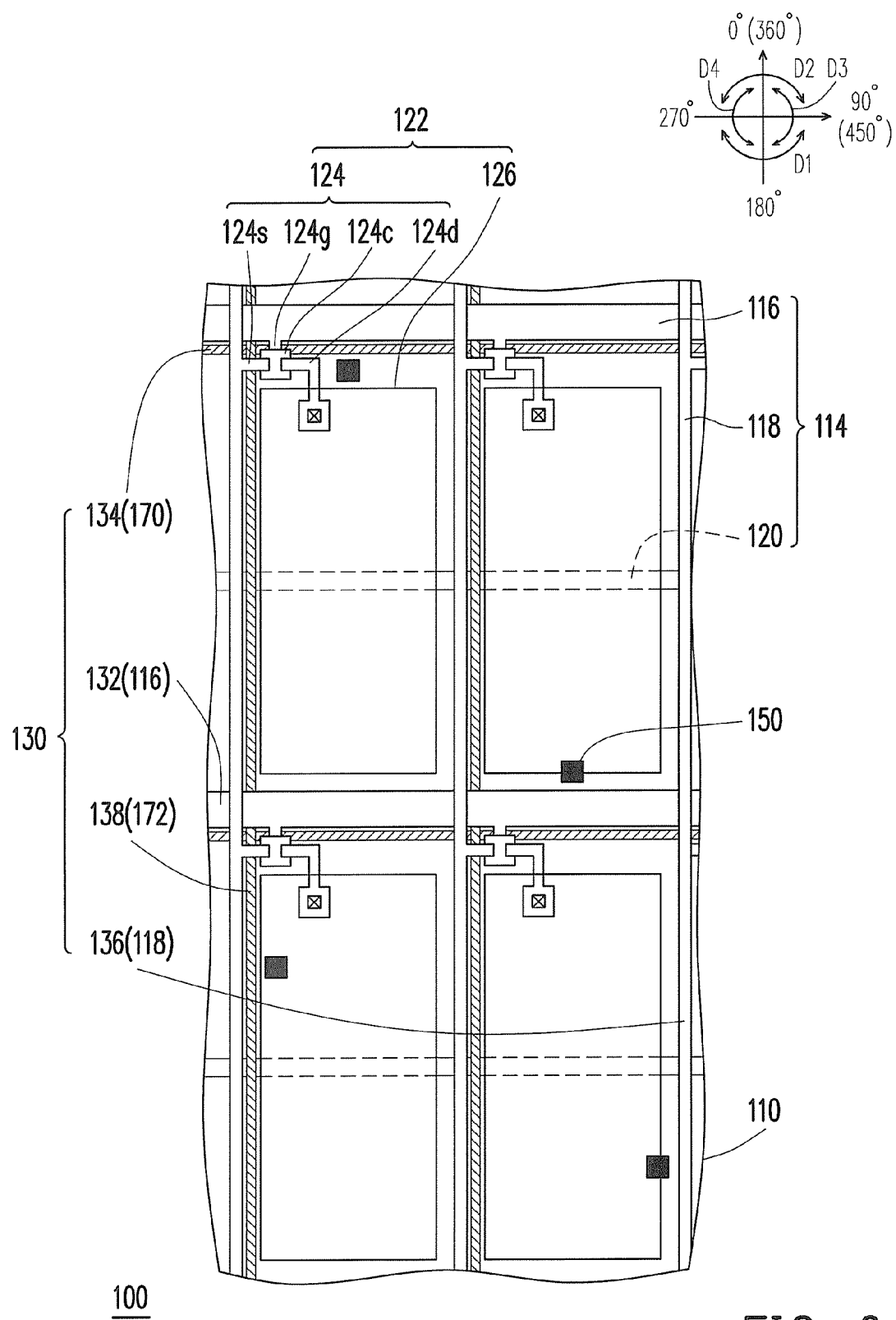
FIG. 6 is a schematic top view of an LCD panel in accordance with an embodiment of the invention.

FIG. 6 is a schematic top view of an LCD panel in accordance with an embodiment of the invention. For clarity of illustration, the opposite substrate and the liquid crystal layer are omitted in FIG. 6. The active device array substrate 110 depicted in FIG. 6 is similar to the active device array substrate illustrated in FIG. 5, but a difference therebetween is that the active device array substrate 110 of FIG. 6 further includes a plurality of dummy lines 172. An extended direction of the dummy lines 172 is, for example, substantially parallel to an extended direction of the data lines 118. In the present embodiment, the active device array substrate 110 includes a plurality of position limiting structures 130, in which each of the position limiting structures 130 includes a first position limiting pattern 132, a second position limiting pattern 134, a third position limiting pattern 136, and a fourth position limiting pattern 138. Moreover, the scan lines 116 serve as the first position limiting patterns 132, the dummy lines 170 serve as the second position limiting patterns 134, the data lines 118 serve as the third position limiting patterns 136, and the dummy lines 172 serve as the fourth position limiting patterns 138. The spacers 150 are extended adjacent to the first to fourth position limiting patterns 132, 134, 136, and 138. Accordingly, the first position limiting patterns 132 limit the displacement of a portion of the spacers 150 along the first azimuth range D1, the second position limiting patterns 134 limit the displacement of a portion of the spacers 150 along the second azimuth range D2, the third position limiting patterns 136 limit the displacement of a portion of the spacers 150 along the third azimuth range D3, and the fourth position limiting patterns 138 limit the displacement of a portion of the spacers 150 along the fourth azimuth range D4. In the present embodiment of the invention, an extended direction of the data lines 118 is defined as 0°, the first azimuth range D1 is exemplarily 90°-270°, the second azimuth range D2 is exemplarily 270°-450°, the third azimuth range D3 is exemplarily 0°-180°, and the fourth azimuth range D4 is exemplarily 180°-360°. In other words, the position limiting structures 130 in the present embodiment including the position limiting patterns 132, 134, 136, and 138 can limit the displacement of the spacers 150 along the vertical or the horizontal direction, so as to prevent an misalignment between the active device array substrate 110 and the opposite substrate 140. It should be mentioned that, in the present embodiment, the plurality of scan lines 116, common lines 120, and dummy lines 170 are formed by the first patterned conductive layer (Metal 1), for example, and the plurality of data lines 118 and dummy lines 172 are formed by the second patterned conductive layer (Metal 2), for instance. In other words, the scan lines 116 and dummy lines 170 serving as the first and second position limiting patterns 132 and 134 are formed by the first patterned conductive layer (Metal 1). The data lines 118 and dummy lines 172 serving as the third and fourth position limiting patterns 136 and 138 are formed by the second patterned conductive layer (Metal 2).

Figure 7:
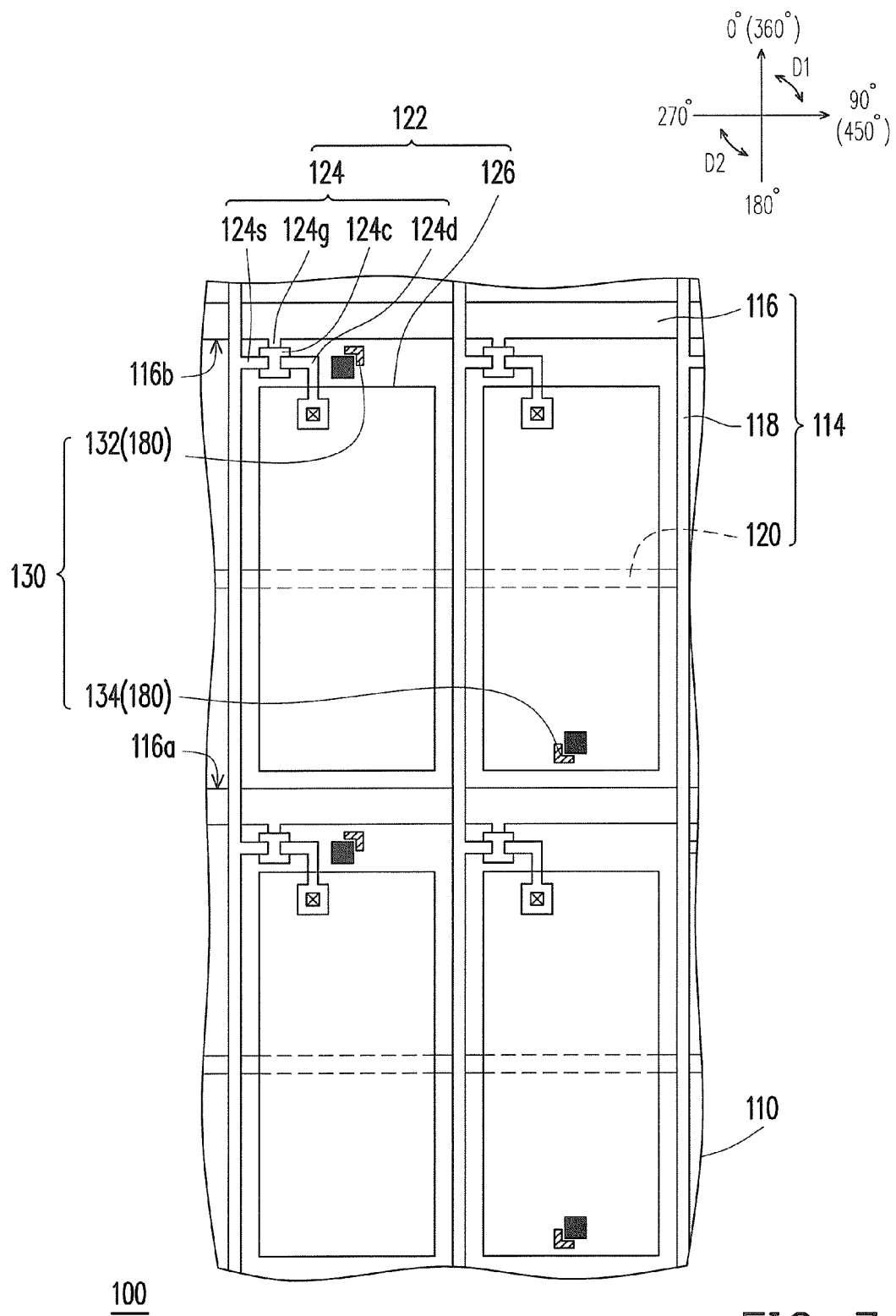
FIG. 7 is a schematic top view of an LCD panel in accordance with an embodiment of the invention.

FIG. 7 is a schematic top view of an LCD panel in accordance with an embodiment of the invention. For clarity of illustration, the opposite substrate and the liquid crystal layer are omitted in FIG. 7. Referring to FIG. 7, in the present embodiment, the active device array substrate 110 includes a substrate 112, a plurality of signal lines 114, a plurality of dummy patterns 180, and a plurality of sub-pixels 122. The signal lines 114 are disposed on the substrate 112, and the signal lines 114 include a plurality of scan lines 116, a plurality of data lines 118, and a plurality of common lines 120. The dummy patterns are disposed on the substrate 112, and the dummy patterns 180 may be used, for example, as the first and second position limiting patterns 132 and 134. In the present embodiment, the first and second position limiting patterns 132 and 134 are exemplarily L-shaped position limiting patterns. The spacers 150 are extended adjacent to the first and second position limiting patterns 132 and 134. Accordingly, the first position limiting patterns 132 limit the displacement of a portion of the spacers 150 along the first azimuth range D1, and the second position limiting patterns 134 limit the displacement of a portion of the spacers 150 along the second azimuth range D2. In the present embodiment of the invention, an extended direction of the data lines 118 is defined as 0°, the first azimuth range D1 is exemplarily 0°-90°, and the second azimuth range D2 is exemplarily 180°-270°. In other words, the position limiting structures 130 including the first and second position limiting patterns 132 and 134 can limit the displacement of the spacers 150 along the vertical or the horizontal direction, so as to prevent an misalignment between the active device array substrate 110 and the opposite substrate 140. It should be noted that, in the present embodiment, the plurality of scan lines 116, common lines 120, and the first and second position limiting patterns 132 and 134 are formed by the first patterned conductive layer (Metal 1), for example, and the plurality of data lines 118 are formed by the second patterned conductive layer (Metal 2), for instance. However, in another embodiment of the invention, the plurality of scan lines 116 and common lines 120 are formed by the first patterned conductive layer (Metal 1), for example, and the plurality of data lines 118 and the first and second position limiting patterns 132 and 134 are formed by the second patterned conductive layer (Metal 2), for instance. Moreover, the first and second position limiting patterns 132 and 134 may also be formed by a patterned semiconductor layer. In other words, embodiments of the invention do not restrict the material of the first and second position limiting patterns 132 and 134.

Figure 8:
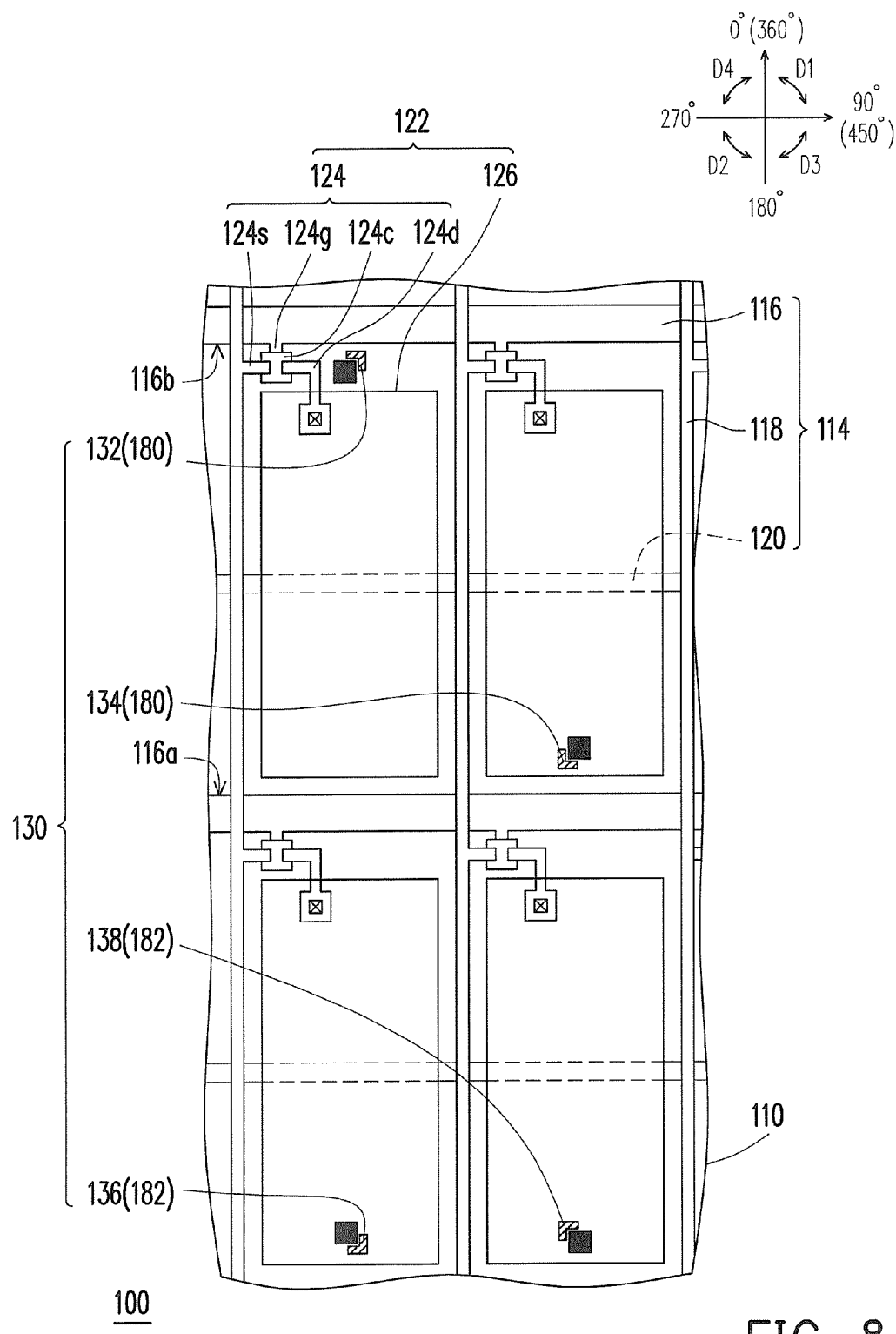
FIG. 8 is a schematic top view of an LCD panel in accordance with an embodiment of the invention.

FIG. 8 is a schematic top view of an LCD panel in accordance with an embodiment of the invention. For clarity of illustration, the opposite substrate and the liquid crystal layer are omitted in FIG. 8. The active device array substrate 110 depicted in FIG. 8 is similar to the active device array substrate 110 illustrated in FIG. 7, but a difference therebetween is that each of the position limiting structures 130 of the active device array substrate 110 of FIG. 8 further includes a dummy pattern 182 serving as a third position limiting pattern 136 and a fourth position limiting pattern 138. Moreover, the third position limiting patterns 136 limit a portion of the spacers 150 along the third azimuth range D3, and the fourth position limiting patterns 138 limit a portion of the spacers 150 along the fourth azimuth range D4. In addition, the third azimuth range D3 and the fourth azimuth range D4 are different. In the present embodiment, the third and fourth position limiting patterns 136 and 138 are exemplarily L-shaped position limiting patterns. An extended direction of the data lines 118 is defined as 0°, the third azimuth range D3 is exemplarily 90°-180°, and the fourth azimuth range D4 is exemplarily 270°-360°. In other words, the position limiting structures 130 in the present embodiment including the position limiting patterns 132, 134, 136, and 138 can limit the displacement of the spacers 150 along the vertical or the horizontal direction, so as to prevent an misalignment between the active device array substrate 110 and the opposite substrate 140. Similarly, in the present embodiment, the third and fourth position limiting patterns 136 and 138 may be formed by the first patterned conductive layer (Metal 1), the second patterned conductive layer (Metal 2), the patterned semiconductor layer, or other suitable material layers.

Figure 9:
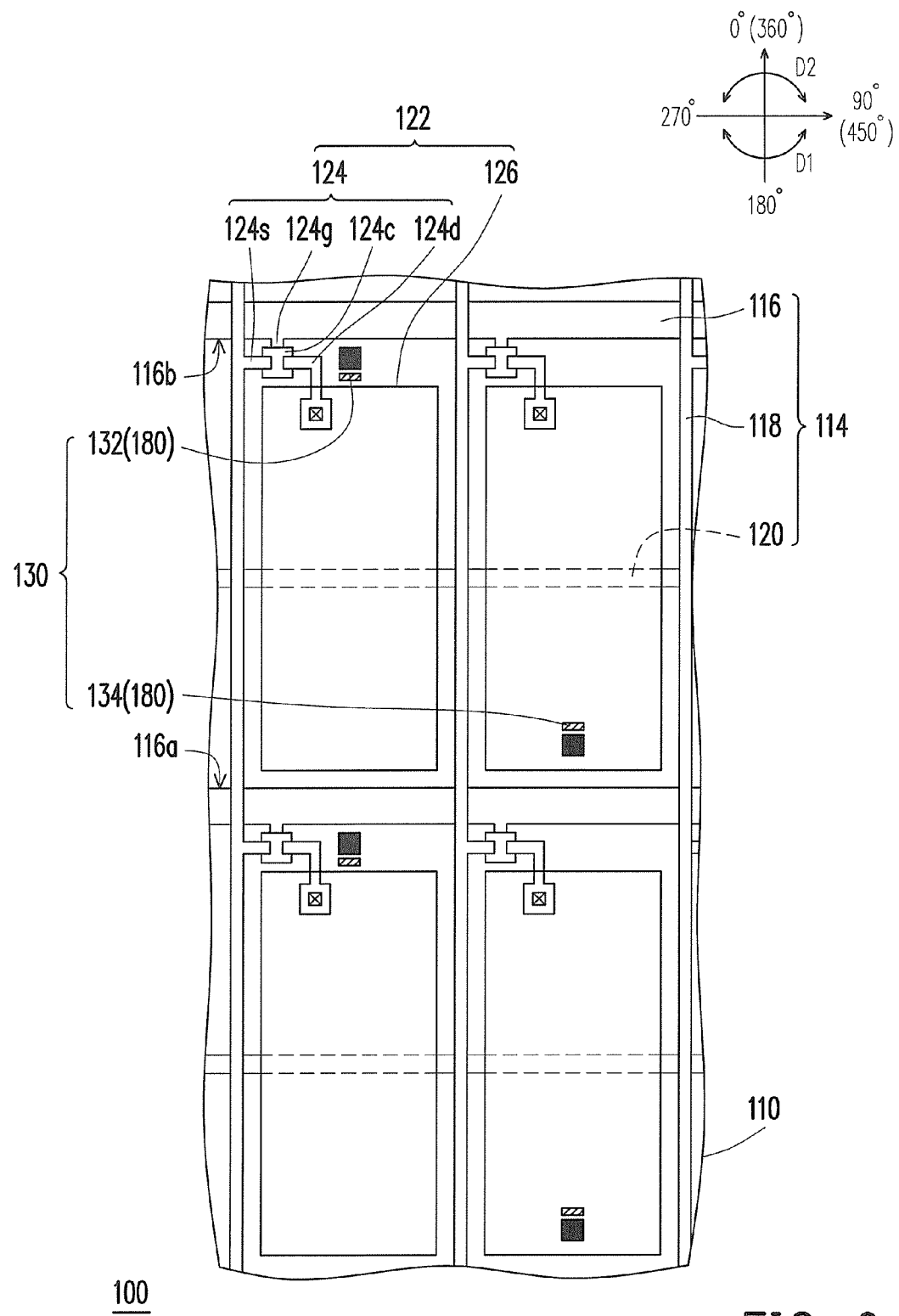
FIG. 9 is a schematic top view of an LCD panel in accordance with an embodiment of the invention.

FIG. 9 is a schematic top view of an LCD panel in accordance with an embodiment of the invention. For clarity of illustration, the opposite substrate and the liquid crystal layer are omitted in FIG. 9. The active device array substrate 110 depicted in FIG. 9 is similar to the active device array substrate 110 illustrated in FIG. 7, but a difference therebetween is in the shape of the first and second position limiting patterns 132 and 134. In the present embodiment of the invention, the first and second position limiting patterns 132 and 134 are exemplarily strip position limiting patterns. The first position limiting patterns 132 limit the displacement of a portion of the spacers 150 along the first azimuth range D1, and the second position limiting patterns 134 limit the displacement of a portion of the spacers 150 along the second azimuth range D2. In the present embodiment of the invention, an extended direction of the data lines 118 is defined as 0°, the first azimuth range D1 is exemplarily 90°-270°, and the second azimuth range D2 is exemplarily 270°-450°. In other words, the position limiting structures 130 including the first and second position limiting patterns 132 and 134 can limit the displacement of the spacers 150 along the vertical direction, so as to prevent an misalignment between the active device array substrate 110 and the opposite substrate 140.

Figure 10:
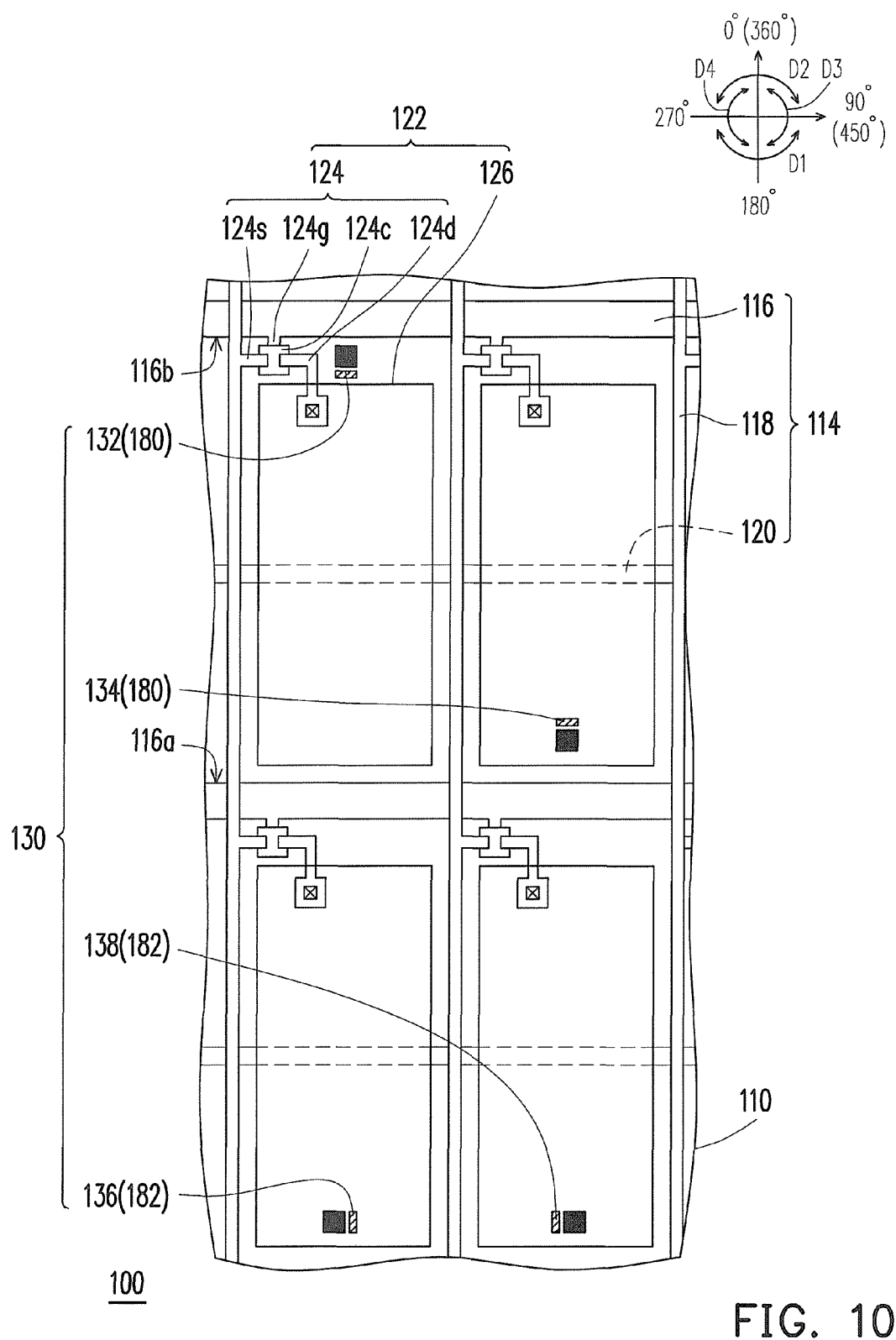
FIG. 10 is a schematic top view of an LCD panel in accordance with an embodiment of the invention.

FIG. 10 is a schematic top view of an LCD panel in accordance with an embodiment of the invention. For clarity of illustration, the opposite substrate and the liquid crystal layer are omitted in FIG. 10. The active device array substrate 110 depicted in FIG. 10 is similar to the active device array substrate 110 illustrated in FIG. 9, but a difference therebetween is that each of the position limiting structures 130 of the active device array substrate 110 of FIG. 8 further includes a third position limiting pattern 136 and a fourth position limiting pattern 138. Moreover, the third position limiting patterns 136 limit a portion of the spacers 150 along the third azimuth range D3, and the fourth position limiting patterns 138 limit a portion of the spacers 150 along the fourth azimuth range D4. In addition, the third azimuth range D3 and the fourth azimuth range D4 are different. In the present embodiment, the third and fourth position limiting patterns 136 and 138 are exemplarily strip position limiting patterns. An extended direction of the data lines 118 is defined as 0°, the third azimuth range D1 is exemplarily 0°-180°, and the fourth azimuth range D4 is exemplarily 180°-360°. In other words, the position limiting structures 130 in the present embodiment including the position limiting patterns 132, 134, 136, and 138 can limit the displacement of the spacers 150 along the vertical or the horizontal direction, so as to prevent an misalignment between the active device array substrate 110 and the opposite substrate 140.

Figure 11:
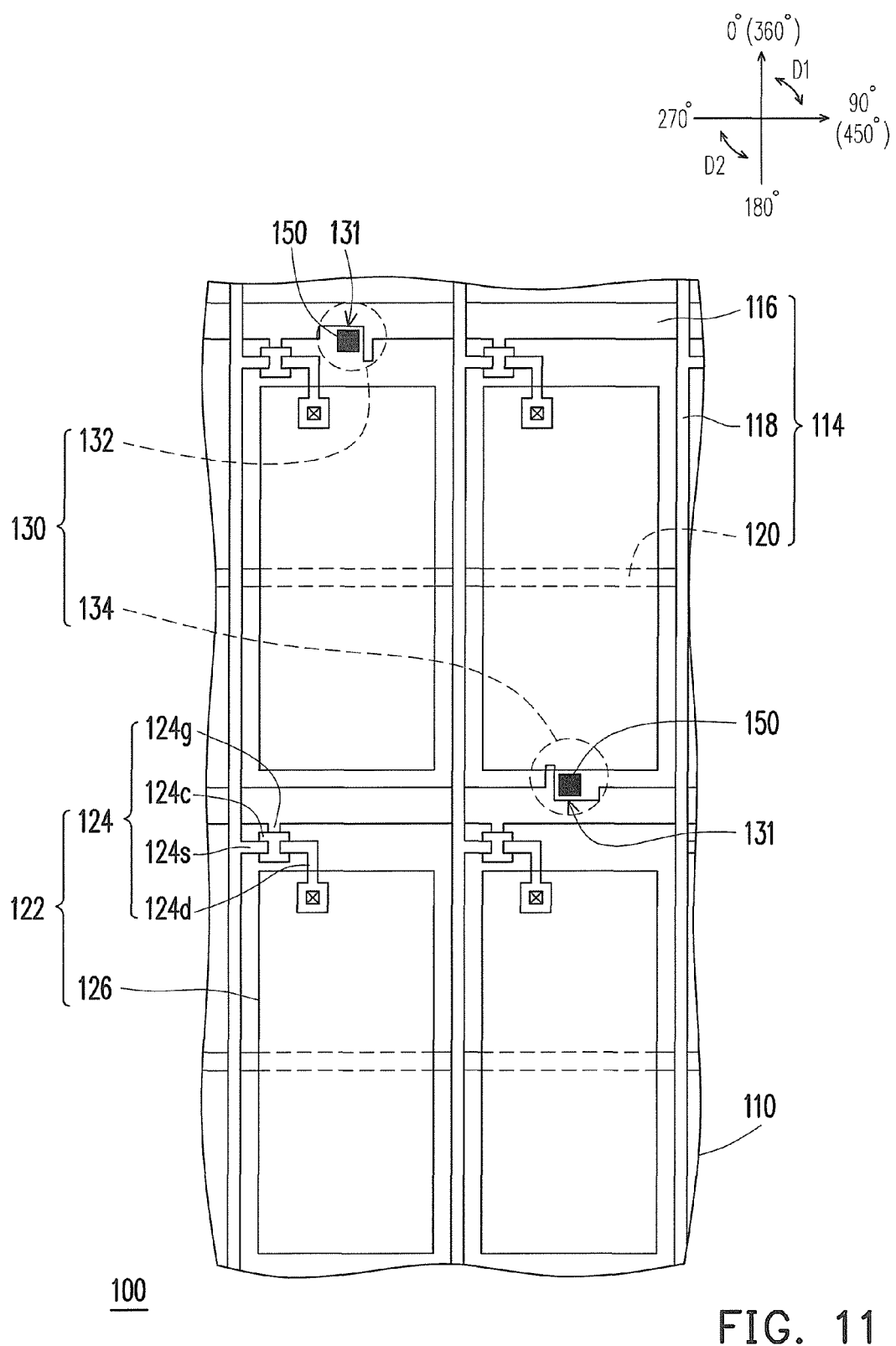
FIG. 11 is a schematic top view of an LCD panel in accordance with an embodiment of the invention.

FIG. 11 is a schematic top view of an LCD panel in accordance with an embodiment of the invention. For clarity of illustration, the opposite substrate and the liquid crystal layer are omitted in FIG. 11. In the present embodiment, the active device array substrate 110 includes a substrate 112, a plurality of signal lines 114, and a plurality of sub-pixels 122. The signal lines 114 are disposed on the substrate 112, and the signal lines 114 include a plurality of scan lines 116, a plurality of data lines 118, and a plurality of common lines 120. The sub-pixels 122 are disposed on the substrate 112 and electrically connected to the signal lines 114. In the present embodiment, the scan lines 116 include the first and second position limiting patterns 132 and 134, and each of the first and second position limiting patterns 132 and 134 respectively defines an opening 131 on the signal lines 114. Moreover, each of the openings 131 respectively corresponds to one of the spacers 150. The first and second position limiting patterns 132 and 134 include, for example, a protruded portion from the scan lines 116. Therefore, the first and second position limiting patterns 132 and 134 are exemplarily L-shaped position limiting patterns. The first position limiting patterns 132 limit the displacement of a portion of the spacers 150 along the first azimuth range D1, and the second position limiting patterns 134 limit the displacement of a portion of the spacers 150 along the second azimuth range D2. Moreover, the first azimuth range D1 and the second azimuth range D2 are different. In the present embodiment of the invention, an extended direction of the data lines 118 is defined as 0°, the first azimuth range D1 is exemplarily 0°-90°, and the second azimuth range D2 is exemplarily 180°-270°. In other words, the position limiting structures 130 including the first and second position limiting patterns 132 and 134 can limit the displacement of the spacers 150 along the vertical and the horizontal direction, so as to prevent an misalignment between the active device array substrate 110 and the opposite substrate 140.

Figure 12:
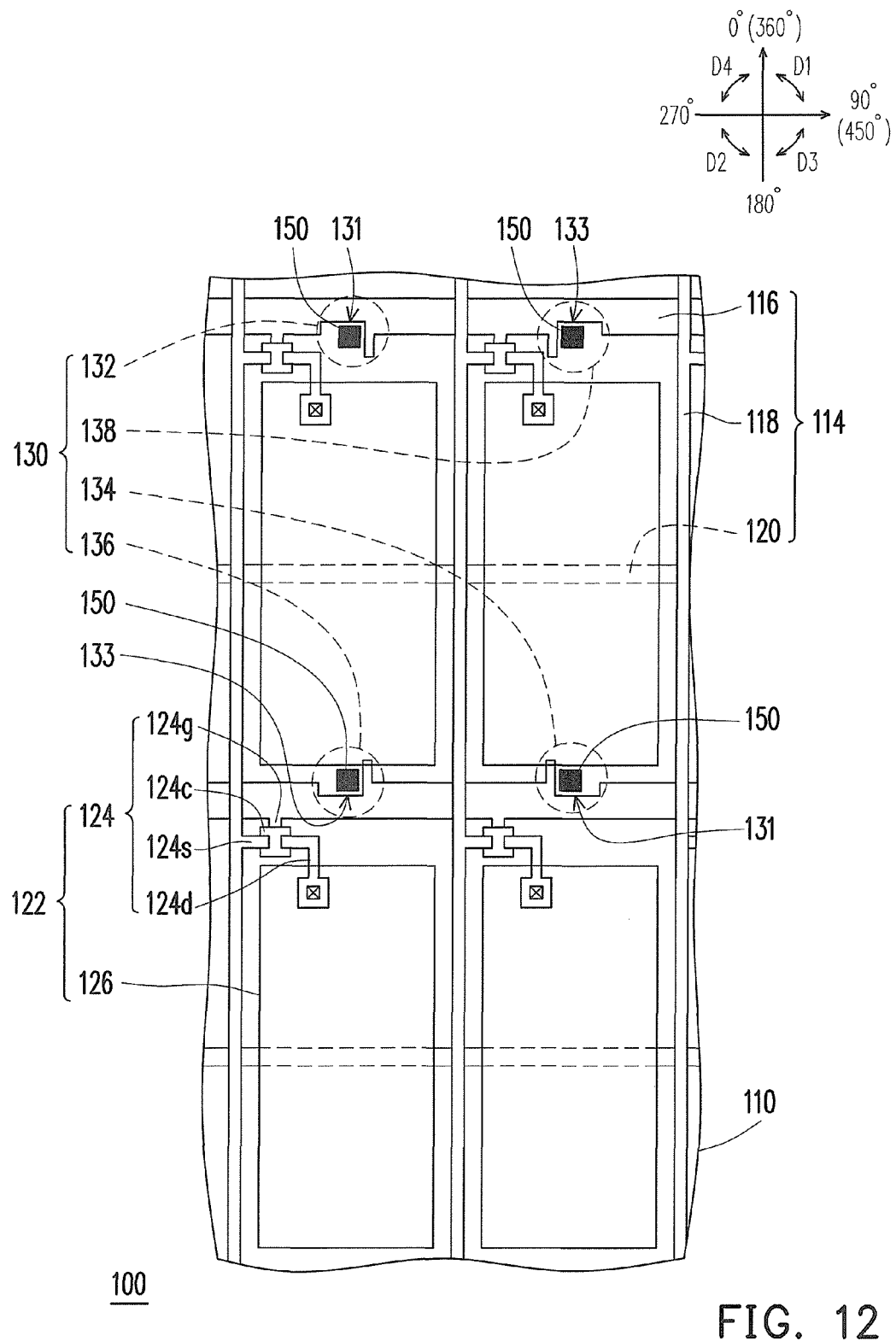
FIG. 12 is a schematic top view of an LCD panel in accordance with an embodiment of the invention.

FIG. 12 is a schematic top view of an LCD panel in accordance with an embodiment of the invention. For clarity of illustration, the opposite substrate and the liquid crystal layer are omitted in FIG. 12.

The active device array substrate 110 depicted in FIG. 12 is similar to the active device array substrate 110 illustrated in FIG. 11, but a difference therebetween is that each of the position limiting structures 130 of the active device array substrate 110 of FIG. 12 further includes a third position limiting pattern 136 and fourth position limiting pattern 138. In the present embodiment, the scan lines 116 further include the third and fourth position limiting patterns 136 and 138, and each of the third and fourth position limiting patterns 136 and 138 respectively defines an opening 133 on the data ines 118. Moreover, each of the openings 133 respectively corresponds to one of the spacers 150. The third and fourth position limiting patterns 136 and 138 are exemplarily L-shaped position limiting patterns. The third position limiting patterns 136 limit the displacement of a portion of the spacers 150 along the third azimuth range D3, and the fourth position limiting patterns 138 limit the displacement of a portion of the spacers 150 along the fourth azimuth range D4. Moreover, the third azimuth range D3 and the fourth azimuth range D4 are different. In the present embodiment of the invention, an extended direction of the data lines 118 is defined as 0°, the third azimuth range D3 is exemplarily 90°-180°, and the fourth azimuth range D4 is exemplarily 270°-360°. In other words, the position limiting structures 130 in the present embodiment including the position limiting patterns 132, 134, 136, and 138 can limit the displacement of the spacers 150 along the vertical or the horizontal direction, so as to prevent an misalignment between the active device array substrate 110 and the opposite substrate 140. It is particularly worth noting that, although the embodiments depicted in FIGS. 11 and 12 are exemplified by the scan lines 116 having the position limiting patterns 132, 134, 136, and 138 with the defined openings 131 and 133, in other embodiments of the invention, the data lines and the common lines may also have position limiting patterns having defined openings, so as to limit the displacement of the spacers 150 along the vertical or the horizontal direction.

Figure 13:
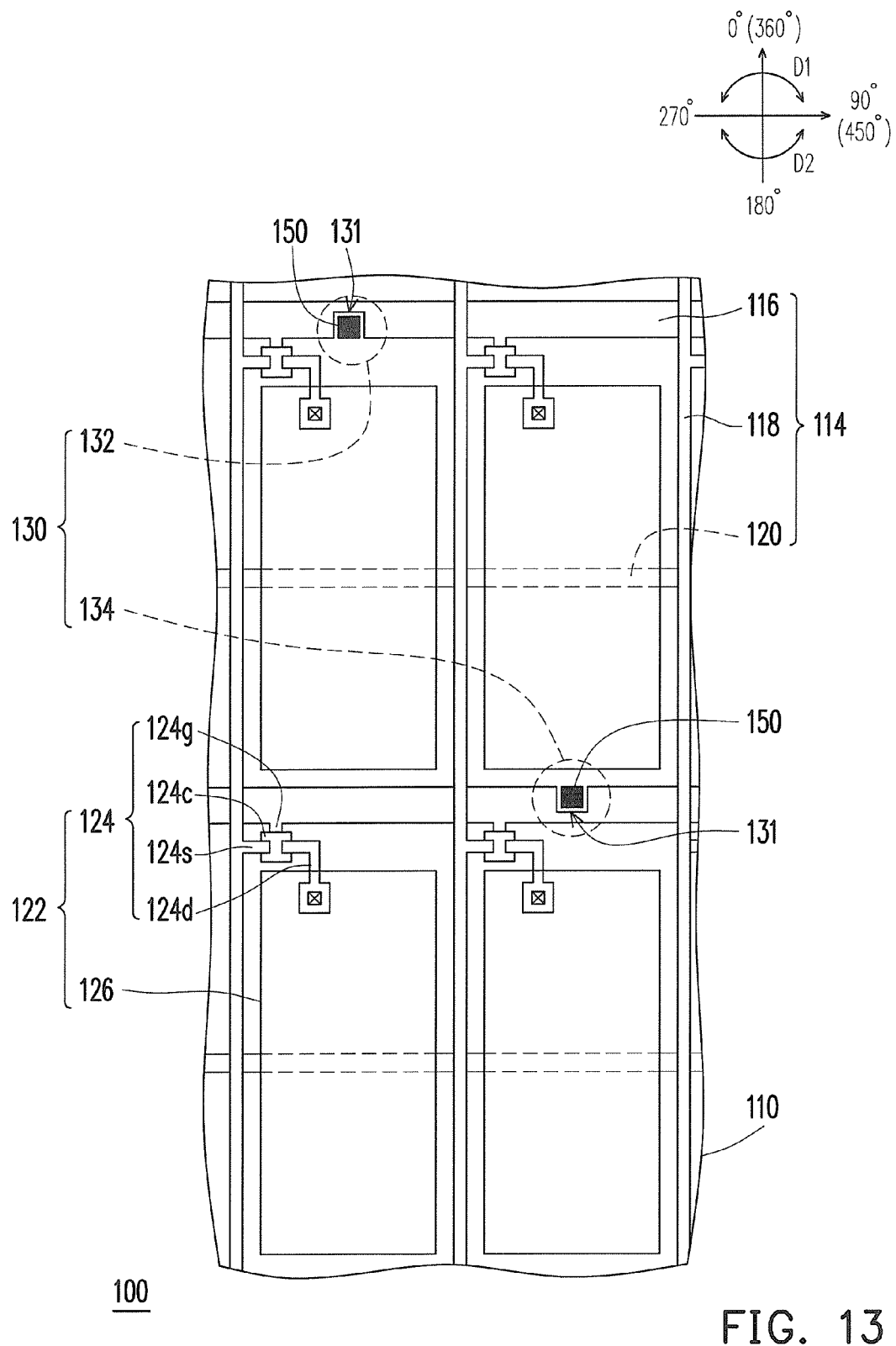
FIG. 13 is a schematic top view of an LCD panel in accordance with an embodiment of the invention.

FIG. 13 is a schematic top view of an LCD panel in accordance with an embodiment of the invention. For clarity of illustration, the opposite substrate and the liquid crystal layer are omitted in FIG. 13. The active device array substrate 110 depicted in FIG. 13 is similar to the active device array substrate 110 illustrated in FIG. 11, but a difference therebetween is in the shape of the first and second position limiting patterns 132 and 134 of the active device array substrate 110 in FIG. 13. In the present embodiment, the scan lines 116 include, for example, the first and second position limiting patterns 132 and 134, and each of the first and second position limiting patterns 132 and 134 respectively define an opening 131 on the signal lines 114. Moreover, each of the openings 131 respectively corresponds to one of the spacers 150. The first and second position limiting patterns 132 and 134 are exemplarily U-shaped position limiting patterns. The first position limiting patterns 132 limit the displacement of a portion of the spacers 150 along the first azimuth range D1, and the second position limiting patterns 134 limit the displacement of a portion of the spacers 150 along the second azimuth range D2. Moreover, the first azimuth range D1 and the second azimuth range D2 are different. In the present embodiment of the invention, an extended direction of the data lines 118 is defined as 0°, the first azimuth range D1 is exemplarily 270°-450°, and the second azimuth range D2 is exemplarily 90°-270°. In other words, the position limiting structures 130 including the first and second position limiting patterns 132 and 134 can limit the displacement of the spacers 150, so as to prevent an misalignment between the active device array substrate 110 and the opposite substrate 140.

It should be understood that, although in the foregoing embodiments the signal lines, the dummy lines, the dummy patterns, and the signal lines with openings respectively serve as the position limiting patterns, these position limiting patterns may substantially serve as mutually complementary patterns. Moreover, embodiments of the invention do not limit the shape of the openings and the position limiting patterns. The shape of the position limiting patterns may have the L-shape depicted in FIGS. 11 and 12, the U-shape depicted in FIG. 13, or any other suitable shapes.

In view of the foregoing, the position limiting structures of the LCD panel according to embodiments of the invention can limit the displacement of the spacers, so as to prevent an misalignment between two substrates when the LCD panel is pressed or under stress. Accordingly, a light leakage phenomenon of the LCD panel can be avoided, and thereby the LCD panel is able to achieve a preferable display quality. Particularly, in some embodiments of the invention, because inherent structures of the LCD panel serve as the position limiting patterns, no extra fabrication is involved for these position limiting patterns. Hence, the cost and time for manufacturing the LCD panel do not increase.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A liquid crystal display (LCD) panel, comprising:
an active device array substrate comprising a plurality of position limiting structures, each of the position limiting structures comprising a first position limiting pattern and a second position limiting pattern;
an opposite substrate disposed above the active device array substrate;
a plurality of spacers disposed on the opposite substrate, wherein the spacers are protruded towards the active device array substrate and extended adjacent to the first and second position limiting patterns, a displacement of each of the spacers is limited only by one of the first position limiting patterns or only by one of the second position limiting patterns, the first position limiting patterns limit the displacement of a portion of the spacers along a first azimuth range, the second position limiting patterns limit the displacement of a portion of the spacers along a second azimuth range, and the first azimuth range and the second azimuth range are different; and
a liquid crystal layer disposed between the active device array substrate and the opposite substrate.

2. The LCD panel as claimed in claim 1, wherein the active device array substrate comprises:
a substrate;
a plurality of signal lines disposed on the substrate, wherein at least a portion of the signal lines serve as the first and second position limiting patterns; and
a plurality of sub-pixels disposed on the substrate and electrically connected to the signal lines.

3. The LCD panel as claimed in claim 2, wherein the signal lines comprise a plurality of scan lines, a plurality of data lines, and a plurality of common lines.

4. The LCD panel as claimed in claim 2, wherein the signal lines comprise a plurality of scan lines, a plurality of data lines, or a plurality of common lines.

5. The LCD panel as claimed in claim 1, wherein the active device array substrate comprises:
a substrate;
a plurality of signal lines disposed on the substrate, wherein at least a portion of the signal lines serve as the first position limiting patterns;
a plurality of dummy lines disposed on the substrate, wherein the dummy lines serve as the second position limiting patterns; and
a plurality of sub-pixels disposed on the substrate and electrically connected to the signal lines.

6. The LCD panel as claimed in claim 5, wherein the signal lines comprise a plurality of scan lines, a plurality of data lines, and a plurality of common lines.

7. The LCD panel as claimed in claim 5, wherein the signal lines comprise a plurality of scan lines, a plurality of data lines, or a plurality of common lines.

8. The LCD panel as claimed in claim 5, wherein an extended direction of the dummy lines is substantially parallel to an extended direction of the scan lines.

9. The LCD panel as claimed in claim 5, wherein an extended direction of the dummy lines is substantially parallel to an extended direction of the data lines.

10. The LCD panel as claimed in claim 1, wherein the active device array substrate comprises:
a substrate;
a plurality of signal lines disposed on the substrate;
a plurality of dummy patterns disposed on the substrate, wherein the dummy patterns serve as the first and second position limiting patterns; and
a plurality of sub-pixels disposed on the substrate and electrically connected to the signal lines.

11. The LCD panel as claimed in claim 10, wherein the signal lines comprise a plurality of scan lines, a plurality of data lines, and a plurality of common lines.

12. The LCD panel as claimed in claim 10, wherein the signal lines comprise a plurality of scan lines, a plurality of data lines, or a plurality of common lines.

13. The LCD panel as claimed in claim 10, wherein each of the first position limiting patterns and each of the second position limiting patterns are L-shaped position limiting patterns, the first azimuth range is 0°-90°, and the second azimuth range is 180°-270°.

14. The LCD panel as claimed in claim 13, wherein each of the position limiting structures further comprises a third position limiting pattern and a fourth position limiting pattern, the third position limiting patterns limit the displacement of a portion of the spacers along a third azimuth range, the fourth position limiting patterns limit the displacement of a portion of the spacers along a fourth azimuth range, and the third azimuth range and the fourth azimuth range are different.

15. The LCD panel as claimed in claim 14, wherein each of the third position limiting patterns and each of the fourth position limiting patterns are L-shaped position limiting patterns, the third azimuth range is 90°-180°, and the fourth azimuth range is 270°-360°.

16. The LCD panel as claimed in claim 10, wherein each of the first position limiting patterns and each of the second position limiting patterns are strip position limiting patterns.

17. The LCD panel as claimed in claim 16, wherein each of the position limiting structures further comprises a third position limiting pattern and a fourth position limiting pattern, and each of the third position patterns and each of the fourth position limiting patterns are strip position limiting patterns.

18. The LCD panel as claimed in claim 17, wherein an extended direction of each of the first and second position limiting patterns is substantially perpendicular to the data lines, and an extended direction of each of the third and fourth position limiting patterns is substantially parallel to the data lines.

19. The LCD panel as claimed in claim 1, wherein the active device array substrate comprises:
   a substrate;
   a plurality of signal lines disposed on the substrate, wherein the signal lines comprises the first position limiting patterns and the second position limiting patterns, each of the first and second position limiting patterns respectively defining an opening on the signal lines, and each of the openings respectively corresponds to one of the spacers; and
   a plurality of sub-pixels disposed on the substrate and electrically connected to the signal lines.

20. The LCD panel as claimed in claim 19, wherein the signal lines comprise a plurality of scan lines, a plurality of data lines, and a plurality of common lines.

21. The LCD panel as claimed in claim 19, wherein the signal lines comprise a plurality of scan lines, a plurality of data lines, or a plurality of common lines.

22. The LCD panel as claimed in claim 19, wherein each of the first position limiting patterns and each of the second position limiting patterns are L-shaped position limiting patterns, the first azimuth range is 0°-90°, and the second azimuth range is 180°-270°.

23. The LCD panel as claimed in claim 22, wherein each of the position limiting structures further comprises a third position limiting pattern and a fourth position limiting pattern, the third position limiting patterns limit the displacement of a portion of the spacers along a third azimuth range, the fourth position limiting patterns limit the displacement of a portion of the spacers along a fourth azimuth range, and the third azimuth range and the fourth azimuth range are different.

24. The LCD panel as claimed in claim 23, wherein each of the third position limiting patterns and each of the fourth position limiting patterns are L-shaped position limiting patterns, the third azimuth range is 90°-180°, and the fourth azimuth range is 270°-360°.

25. The LCD panel as claimed in claim 1, wherein the active device array substrate comprises:
   a substrate;
   a first patterned conductive layer disposed on the substrate, wherein the first patterned conductive layer comprises a plurality of scan lines, a plurality of common lines, the first position limiting patterns, and the second position limiting patterns;
   a second patterned conductive layer disposed on the substrate, wherein the second patterned conductive layer comprises a plurality of data lines intersected with the scan lines and the common lines; and
   a plurality of sub-pixels disposed on the substrate and electrically connected to the scan lines and the data lines.

26. The LCD panel as claimed in claim 1, wherein the active device array substrate comprises:
   a substrate;
   a first patterned conductive layer disposed on the substrate, wherein the first patterned conductive layer comprises a plurality of scan lines and a plurality of common lines, and the scan lines and the common lines serve as the first position limiting patterns and the second position limiting patterns;
   a second patterned conductive layer disposed on the substrate, wherein the second patterned conductive layer comprises a plurality of data lines intersected with the scan lines and the common lines; and
   a plurality of sub-pixels disposed on the substrate and electrically connected to the scan lines and the data lines.

27. The LCD panel as claimed in claim 1, wherein the active device array substrate comprises:
   a substrate;
   a first patterned conductive layer disposed on the substrate, wherein the first patterned conductive layer comprises a plurality of scan lines and a plurality of common lines, and the scan lines or the common lines serve as the first position limiting patterns and the second position limiting patterns;
   a second patterned conductive layer disposed on the substrate, wherein the second patterned conductive layer comprises a plurality of data lines intersected with the scan lines and the common lines; and
   a plurality of sub-pixels disposed on the substrate and electrically connected to the scan lines and the data lines.

28. The LCD panel as claimed in claim 1, wherein the active device array substrate comprises:
   a substrate;
   a first patterned conductive layer disposed on the substrate, wherein the first patterned conductive layer comprises a plurality of scan lines and a plurality of common lines;
   a second patterned conductive layer disposed on the substrate, wherein the second patterned conductive layer comprises a plurality of data lines intersected with the scan lines and the common lines, the first position limiting patterns, and the second position limiting patterns; and
   a plurality of sub-pixels disposed on the substrate and electrically connected to the scan lines and the data lines.

29. The LCD panel as claimed in claim 1, wherein the active device array substrate comprises:
   a substrate;
   a first patterned conductive layer disposed on the substrate, wherein the first patterned conductive layer comprises a plurality of scan lines and a plurality of common lines;
   a second patterned conductive layer disposed on the substrate, wherein the second patterned conductive layer comprises a plurality of data lines intersected with the scan lines and the common lines, and the data lines serve as the first position limiting patterns and the second position limiting patterns; and
   a plurality of sub-pixels disposed on the substrate and electrically connected to the scan lines and the data lines.

* * * * *